United States Patent [19]

Barthel

[11] Patent Number: 4,569,890
[45] Date of Patent: Feb. 11, 1986

[54] PROCESS FOR INCREASING THE HEATING VALUE OF FUEL GAS MIXTURES CONTAINING HYDROGEN

[75] Inventor: Günter Barthel, Rheinberg, Fed. Rep. of Germany

[73] Assignee: Ruhrgas Aktiengesellschaft, Essen, Fed. Rep. of Germany

[21] Appl. No.: 375,110

[22] Filed: May 5, 1982

[30] Foreign Application Priority Data

May 8, 1981 [DE] Fed. Rep. of Germany ....... 3118178

[51] Int. Cl.$^4$ ............................ H01M 8/04; C10J 1/00
[52] U.S. Cl. .......................................... 429/17; 429/8; 429/19; 48/197 FM
[58] Field of Search ................................ 429/8, 19, 17; 48/197 FM

[56] References Cited

U.S. PATENT DOCUMENTS

| | | | |
|---|---|---|---|
| Re. 29,312 | 7/1977 | Mallan et al. | 48/209 |
| 1,596,729 | 8/1926 | Harris | 48/197 FM |
| 1,863,636 | 6/1932 | Quelch | 48/197 FM |
| 3,669,751 | 12/1972 | Richman | 429/19 |
| 3,877,989 | 4/1975 | Waldman et al. | 429/19 |
| 3,976,506 | 8/1976 | Landau | 429/19 |
| 3,976,507 | 8/1976 | Bloomfield | 429/19 |
| 4,127,468 | 11/1978 | Alfenaar et al. | 429/40 |
| 4,128,700 | 12/1978 | Sederquist | 429/19 |
| 4,250,230 | 7/1981 | Terry | 429/12 |
| 4,298,453 | 11/1981 | Schoennagel et al. | 48/197 FM |
| 4,309,359 | 1/1982 | Pinto | 429/16 X |
| 4,333,992 | 6/1982 | Healy | 429/17 |
| 4,365,006 | 12/1982 | Baker | 429/17 |
| 4,365,007 | 12/1982 | Maru et al. | 429/19 |

OTHER PUBLICATIONS

Hackh's Chemical Dictionary; Julius Grant, ed.; 1972; New York et al.; McGraw-Hill Book Company; pp. 258 and 314.

*Primary Examiner*—Brian E. Hearn
*Assistant Examiner*—Stephen J. Kalafut
*Attorney, Agent, or Firm*—Beall Law Offices

[57] ABSTRACT

Fuel gas mixtures of different composition containing hydrogen may be the main products or by-products of chemical conversion processes such as, without limitation, processes for the conversion of solid or liquid fuels. Such gas mixtures are, however, normally not fit for public gas supplies, as their heating value and their density and other properties would normally not conform to the standards and the codes of practice for gas properties. Methanation is a known process for the conversion of hydrogen-rich fuel gas mixtures into gases conforming to standard specifications. During the exothermal reaction of methanation, more than 15% of the enthalphy of the reactants may be lost.

The invention allows the increase of the heating value of hydrogen-rich fuel gas mixtures, said increase being achieved at a high efficiency and maximizing the recovery of useful energy in the form of gas conforming to standards and electric power.

The invention employs a fuel cell unit to which the complete gas mixture is supplied and in which part or all of the hydrogen contained in said gas mixture is oxidized by an electrochemical reaction and from which the constituents not so oxidized are removed inclusive of any hydrogen which may not have been so oxidized.

19 Claims, No Drawings

PROCESS FOR INCREASING THE HEATING VALUE OF FUEL GAS MIXTURES CONTAINING HYDROGEN

BACKGROUND OF THE INVENTION

The invention concerns a process for increasing the heating value of fuel gas mixtures containing hydrogen by the conversion of said hydrogen.

Gas mixtures containing hydrogen may be the main products or by-products of chemical conversion processes, such as, without limitation, processes for the conversion of solid or liquid fuels and such mixtures may be of different or varying compositions. Such gas mixtures are, however, normally not fit for public gas supplies, as their composition and therefore their heating value, their Wobbe index and their density would normally not be in accordance with the standards and the codes of practice for gas properties ("Technische Regeln für die Gasbeschaffenheit"). The higher heating value, the Wobbe index and the specific gravity of hydrogen-rich gas mixtures are considerably lower than the higher heating value, the Wobbe index and the specific gravity of town gas for which the following minimum values have been set in the code of practice mentioned hereinabove:

$H.H.V. = 17.58 \text{ MJ/m}^3(n)$

Wobbe index (higher heating value divided by square root of density) = 23.86 specific gravity = 0.4

Known processes exist for the conversion of gas mixtures which do not conform to standard specifications, such as, without limitation, hydrogen-rich gas mixtures, into gases having such standard specifications. Such processes include processes for the removal of undesirable constituents, processes for adding desirable constituents and the process of methanation where the constituents of the gas mixture are converted by reactions represented by the following equations:

$$CO + 3H_2 \rightarrow CH_4 + H_2O \quad (1)$$

$$CO_2 + 4H_2 \rightarrow CH_4 + 2H_2O \quad (2)$$

For the known process of methanation, the gas mixture must therefore contain adequate shares of carbon monoxide and/or carbon dioxide, as are normally contained in such gas mixtures. Apart from the contraction in volume causing 4 and 5 parts of carbon monoxide and carbon dioxide respectively and one part of hydrogen to contract to one part of methane in the methanated gas (following the removal of the water formed during the reaction), the major disadvantage of said process of methanation is the fact that methanation is an exothermal reaction giving off considerable heat of reaction, such heat of reaction totalling 220.65 KJ/gmol for equation (1) above and 182.77 kJ/gmol for equation (2) above, so that approximately 20% of the enthalpy of the reacting gases is converted into heat of reaction which can normally only partly be used in other processes, such as the production of saturated steam which may be used for the generation of electric power. If saturated steam produced is used for electric power generation by means of a turbine generator, the efficiency of said use of said heat of reaction may range between 20 and 25% depending on the size of the installation, while more than 15% of the enthalpy of the reactants is lost.

SUMMARY OF THE INVENTION

The object of the invention is an increase in the heating value of hydrogen-rich gas mixtures by hydrogen conversion, said increase being achieved at a high efficiency and maximizing the recovery of useful energy.

Considering said object, the invention employs a fuel cell unit in which part or all of the hydrogen contained in the gas mixture supplied is directly used for the generation of electric power by the electrochemical conversion of said hydrogen.

The use of fuel cells for the electrochemical production of electric energy is state of the art and hydrogen has primarily been used for fueling such cells. It is also known that the efficiency of power generation by fuel cells is considerably higher than the efficiency of power generation in conventional power stations. Further, a process has been described (DP No. 11 46 563) in which the gas mixture feeding the fuel cell contains constituents other than hydrogen which may be oxidized, said process having been developed for converting the hydrogen contained in the gas mixture as completely as possible and to tap the other gas constituents acting as inert gases at the end of a series of fuel cells passed consecutively by the gas mixture, said process being proposed and being considered necessary to eliminate the voltage drop and the reduction in fuel cell current output caused by the formation and collection of inert gas pockets in the porous electrodes.

The basis of the present invention is the consideration that mainly the very low specific gravity of 0.0695 kg/m$^3$(n) and also the very low higher heating value of 12.745 MJ/m$^3$(n) of hydrogen is the cause of the major difference between the properties of hydrogen-rich rich fuel gas mixtures and the properties specified in the code of practice referred to above.

Following a review of the state of the art, it was now found that the use of known fuel cell units would be an optimum method of increasing the heating value of hydrogen-rich gas mixtures at maximum efficiency.

The object of the invention is therefore the use of a fuel cell unit for the conversion of part or all of the hydrogen contained in the gas mixture into electric energy, whereby the composition of the gas is changed in such a manner that the residue gas leaving the fuel cell unit would conform to the standards and codes of practice applicable to public gas supplies. The process invented and its application are described hereinbelow for one typical case.

DETAILED DESCRIPTION OF A PREFERRED EMBODIMENT

At a plant for the gasification of coal under pressure using oxygen and steam as gasification agents, the daily coal throughput is 2,000 tons of coal equivalent of coal with a total lower heating value of approximately 58,615 MJ. Following scrubbing and cooling, the raw gas so manufactured enters a catalytic shift converter, where the following reactions occur at a pressure of approximately 25 bar:

conversion of carbon monoxide and steam contained in the raw gas into carbon dioxide and hydrogen hydrogenation of most unsaturated hydrocarbons contained in the raw gas, such as ethylene, propylene and butylene decomposition and/or hydrogenation of hydrogen cyanide, carbon oxysulphide and organic sulphur compounds Following purification for the removal of most sulphur compounds, condensable hydrocarbons and carbon dioxide from the gas, the composition of the gas is approximately as follows (expressed in percent by volume):

$CO_2$: 8.0%
CO: 1.2%
$H_2$: 67.9%
$CH_4$: 21.6%
$C_2H_6+$: 0.5%
$N_2$: 0.8%

The flow rate is approximately 130,000 $m^3(n)$/hr at the normal temperature of 0° C. and the normal pressure of 1.01325 bar.

The gas is at a temperature of approx. 30° C. and at a gauge pressure of approx. 23 bar. It contains no or only small quantities of steam. According to the present invention, the gas so manufactured and so treated by conventional methods is delivered into a fuel cell unit designed for the generation of electric energy with the inlet gas being heated to a temperature of approximately 160° C. to 170° C. by heat exchange with the gas mixture leaving said fuel cell unit.

Said fuel cell unit may, for example, consist of a total of 700 modules, each module consisting of 290 cells connected in series as in a filter press, and each one of said cells having an electrochemically active electrode surface of 0.3 $m^2$.

The hydrogen-rich gas mixture referred to above enters said fuel cells operated at a temperature of 180° C. at the anodes, while oxygen enters said fuel cells at the cathodes at the same pressure as said gas mixture. The active electrode coating used for said fuel cells may be a material, such as, without limitation, carbon activated by platinum and the electrolyte may be a liquid such as 60–95% (preferably 85%) by weight orthophosphoric acid. For a current density of 1,000 $A/m^2$ of electrode surface and a hydrogen conversion rate of 37 $m^3$/hr for each module, the direct current power generation capacity of each module is 69 kW (300 A, 230 V) and the direct current power generation capacity of all of said 700 modules is 45.1 MW/hr for a hydrogen conversion rate of 25,836 $m^3$/hr.

Following the deduction of the current used for auxiliary and ancillary drivers of the fuel cell units including the equipment required for producing the oxygen needed and following the deduction of transmission switching and inversion losses, the alternating current or three-phase current power generation capacity available is approximately 37.5 MW and the efficiency of power generation is approximately 48.6% of the lower heating value of the hydrogen used.

Following the separation of the steam, the composition (in percent by volume) of the gas leaving the fuel cell units cooled down to approximately 40° C. by heat exchange with the gas entering the fuel cell units is as follows:

$CO_2$: 10.0%
CO: 1.5%
$H_2$: 59.9%
$CH_4$: 27.0%
$C_2H_6+$: 0.6%
$N_2$: 1.0%

The flow rate of said gas at the outlet of the fuel cell units is approximately 103,760 $m^3(n)$/hr at normal conditions and the pressure is 20 bar. Said gas with a higher heating value of approximately 19,012 $KJ/m^3$ and a Wobbe index of 8,628 conforms to the requirements and the codes of practice of the West German gas industry for town gas ("Technische Regeln für die Gasbeschaffenheit" (Gas Properties), code of practice No. G 260 of Deutscher Verein des Gas- und Wasserfaches).

To demonstrate the advantages offered by the process invented, the conventional chemical conversion of hydrogen into methane (methanation) is described hereinbelow for the typical gas production plant referred to above. For conventional chemical conversion, only part of the raw gas enters the shift converter. Following purification as described hereinabove, the composition of the two unified streams of gas (in percent by volume) is as follows:

$CO_2$: 3.7%
CO: 4.8%
$H_2$: 67.7%
$CH_4$: 22.5%
$C_2H_6+$: 0.5%
$N_2$: 0.8%

The flow rate at this point is approximately 124,350 $m^3(n)$/hr at normal conditions.

Said gas enters a conventional catalytic methanation plant. Following the removal of steam, the flow rate of the methanated gas is approximately 112,250 $m^3(n)$/hr at normal conditions and the composition of the methanated gas (in percent by volume) is as follows:

$CO_2$: 11.6%
CO: 1.8%
$H_2$: 53.8%
$CH_4$: 31.7%
$C_2H_6+$: 0.2%
$N_2$: 0.9%

The higher heating value of said gas is 19,432 $KJ/m^3(n)$ and the Wobbe index of said gas is 8,450, said gas conforming to the standards and codes of practice for public gas supplies as referred to hereinabove. The gauge pressure of said methanated gas is 20 bar and the temperature of said methanated gas is approximately 40° C.

The heat of reaction liberated in the conventional methanation reactor is used for the production of saturated steam at a rate of 22.5 tons/hr and for heating boiler feedwater at a rate of 23 tons/hr from 45° C. to 105° C.

Said saturated steam produced may be used for operating a saturated steam turbine driving a generator for the direct production of three-phase current. As the overall electric efficiency of an installation of the type described is approximately 23%, the installation described could be used for power generation at a rate of 2.88 MW/hr, 1,48 MW/hr of the power produced being available for distribution.

The differences between the process invented and the conventional methanation process are tabulated in Table 1.

For the comparison of the energy output in Table 1, the assumption was made that the manufactured gas mentioned in 1 is converted into electric power at a power station operating with an efficiency of 35%. The total energy output expressed in MW is therefore the total electricity which may be produced. The comparison described was made because the direct translation of the heat content of the gas, for example from KJ into MW, would have meant a comparison of heat in the form of electric power and heat in the form of fuel gas, said heats not being directly comparable (any such comparison would have to account for all criteria relevant for valuing the use of electric power and gas for the production of heat).

The Table demonstrates again that the process invented is an improved use of primary energy and may therefore make a contribution to the efficient utilization of energy.

TABLE 1

| Comparison of Processes | | |
|---|---|---|
| | Coal gasification and methanation | Coal gasification and fuel cells |
| 1. Gas production | | |
| (town gas from 2,000 tons of coal equivalent/day) | 112,242 m³(n)/hr | 103,762 m³(n)/hr |
| higher heating value (town gas) | 19,432 KJ/m³(n) | 19,012 KJ/m³(n) |
| Wobbe index (town gas) | 30.42 | 31.07 |
| lower heating value of gas per hour | 2181.08 GJ/hr | 1972.72 GJ/hr |
| 2. Auxiliary energy | | |
| saturated steam, 40 bar | 22.50 tons/hr | — |
| hydrogen, approx. 23 bar | — | 25,836 m³(n)/hr |
| Consequently: | | |
| power generation efficiency, gross | approx. 23% | approx. 58.9% |
| electric energy produced (three-phase) | 2.88 MW | 45.1 MW |
| electric energy available for distribution (three-phase) | 1.48 MW | 37.5 MW |
| 3. Comparison of energy output | | |
| town gas | 182.39 MW | 168.61 MW |
| electric energy | 1.48 MW | 37.50 MW |
| total energy output | 184.87 MW | 206.11 MW |

What is claimed is:

1. A process for increasing the heating value of fuel gas mixtures containing hydrogen gas to at least 17.58 MJ/m³ and increasing the specific gravity of the gas to at least 0.4 comprising:
   (a) gasifying coal under pressure to produce a raw gas comprising hydrogen gas, carbon monoxide, steam, unsaturated hydro-carbons, hydrogen cyanide, and organic sulphur compounds;
   (b) scrubbing and cooling the raw gas;
   (c) conducting all the raw gas to a catalytic shift converter wherein the carbon monoxide and steam are converted to carbon dioxide and hydrogen gas, the hydrocarbons are hydrogenated and the hydrogen cyanide and organic sulfur compounds are at least one of decomposed and hydrogenated;
   (d) removing the sulphur compounds from the gas resulting from (c) to produce a fuel gas mixture containing hydrogen gas;
   (e) supplying all the fuel gas mixture to a fuel cell unit;
   (f) supplying oxygen to the fuel cell unit;
   (g) conducting an electrochemical reaction in the fuel cell unit to oxidize at least part of the hydrogen gas in the fuel gas mixture with the oxygen thereby producing electric energy and steam;
   (h) removing the resulting fuel gas mixture and steam from the fuel cell unit; and
   (i) separating the steam from the resulting fuel gas mixture.

2. The process according to claim 1 wherein the fuel cell unit contains an acid electrolyte and is operated at high pressure.

3. The process according to claim 2 wherein the electrolyte is an aqueous orthophosphoric acid solution with an orthophosphoric acid concentration of 60 to 95% by weight.

4. The process according to claim 3 wherein the concentration of the orthophosphoric acid is 85% by weight.

5. The process according to claim 2 wherein the pressure is approximately 23 bar.

6. The process according to claim 1 wherein the gas mixture supplied to the fuel cell unit is preheated to at least a temperature closed to the operating temperature of the fuel cell unit before it reaches the fuel cell unit by countercurrent heat exchange with the fuel gas mixture having a higher heating value leaving said fuel cell unit.

7. The process according to claim 6 wherein the operating temperature of the fuel cell is 180° C.

8. The process according to claim 7 wherein the fuel gas mixture is preheated to a temperature in the range of 160°–170° C.

9. The process according to claim 1 wherein the fuel gas mixture containing hydrogen gas is a hydrogen-rich fuel gas mixture.

10. The process according to claim 1 wherein the fuel gas mixture containing hydrogen gas is a methane-containing gas produced by the gasification of coal under pressure.

11. The process according to claim 10 wherein the methane-containing gas is converted to gas having at least the heating value of town gas or coke-oven gas by the electrochemical oxidation of at least part of the hydrogen gas contained in the methane-containing gas.

12. The process according to claim 1, wherein each fuel cell unit comprises 700 modules, each module further comprising 290 cells connected in series.

13. The process according to claim 12 wherein each cell comprises an anode and a cathode, the fuel gas mixture entering the cell at the anode and oxygen entering the cell at the cathode.

14. The process according to claim 13 wherein the anode and the cathode have an active electrode coating comprising carbon activated by platinum.

15. The process according to claim 13 wherein each cell has an active electrode surface of 0.3 m².

16. The process according to claim 1 wherein the pressure in the catalytic shift converter is approximately 25 bar and the pressure in the fuel cell unit is approximately 23 bar.

17. The process according to claim 1 wherein the pressure of the fuel cell mixture leaving the fuel cell unit is approximately 20 bar.

18. The process according to claim 1 wherein the temperature of the fuel gas unit mixture leaving the fuel cell unit is cooled to 40° C. by heat exchange with the fuel gas mixture before it reaches the fuel cell unit.

19. The process according to claim 1, wherein a plural member of the fuel cell unit is provided.

* * * * *